UNITED STATES PATENT OFFICE.

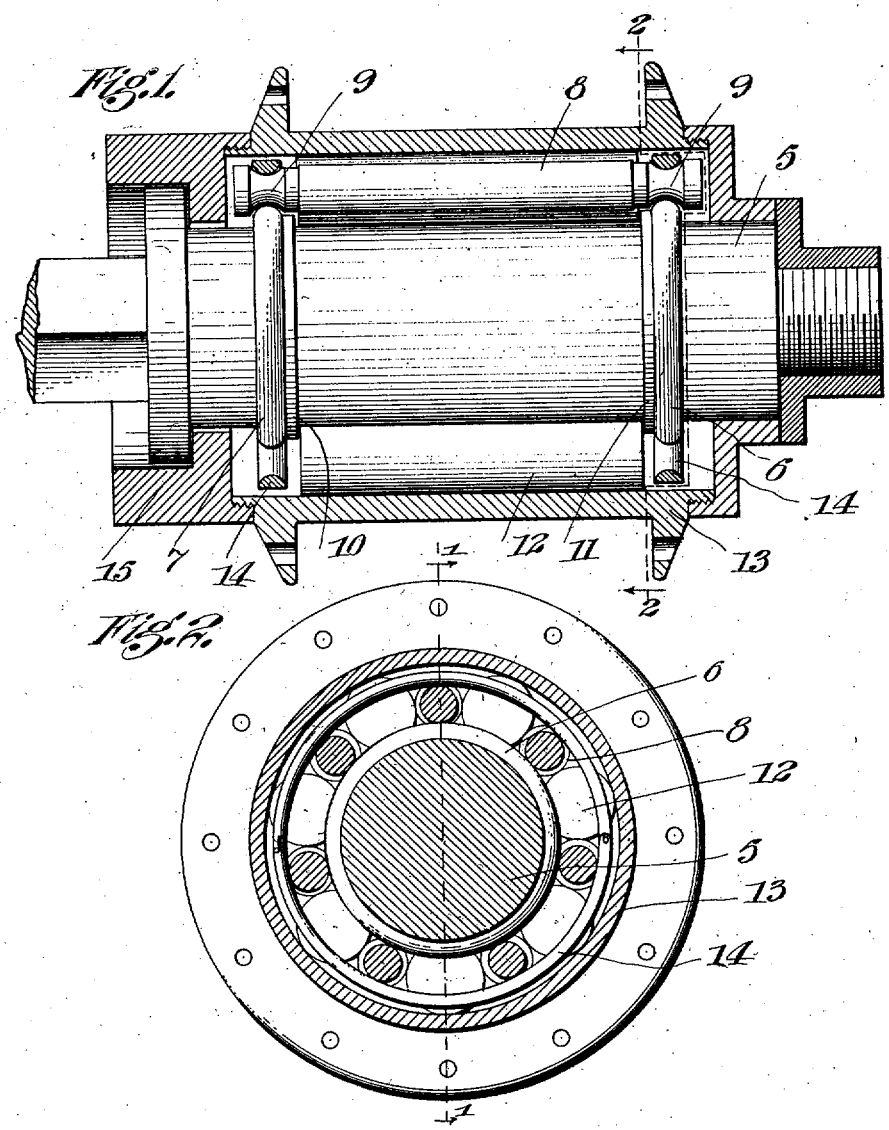

WILLIAM T. FLEMING, OF LOS ANGELES, CALIFORNIA.

ROLLER-BEARING.

No. 853,445.  Specification of Letters Patent.  Patented May 14, 1907.

Application filed September 5, 1906. Serial No. 333,355.

*To all whom it may concern:*

Be it known that I, WILLIAM T. FLEMING, a citizen of the United States, residing at Los Angeles, in the county of Los Angeles and State of California, have invented new and useful Improvements in Roller-Bearings, of which the following is a specification.

My invention relates to improvements in the construction of the rollers of the bearing and the guides therefor and in the spacer rollers and in the means for assembling and holding the rollers together; and the object thereof is to provide a roller bearing in which the bearing and spacer rollers will be evenly held from lateral or twisting movement.

In the drawings forming a part of the application I have illustrated my invention as applied to an axle and wheel, the box of the wheel only being shown; but my invention is equally applicable to bearings where one part is rotatable within or exterior to the other part. I accomplish this object by means of the device described herein and illustrated in the accompanying drawings in which:—

Figure 1—is a section taken on line 1—1 of Fig. 2. Fig. 2—is a section taken on line 2—2 of Fig. 1.

Near each end the axle 5 is provided with annular flanges 6 and 7 whose peripheries are convex which form guides and supports for the ends of the spacing rollers 8, which rollers are provided with concave grooves 9 which straddle the flanges of the axle. These grooves are deep enough to prevent the spacing rollers from having an endwise or lateral movement, but not deep enough to permit the body of the spacing rollers to engage the axle, and being concaved any wear that they might be subjected to would not affect, or shift their position on the tracks as the concaved grooves will always seek the highest point.

The annular flanges 6 and 7 are provided on their sides nearest each other with annular shoulders 10 and 11 between which the bearing rollers 12 are adapted to rotate. The bearing rollers are of a larger diameter than the spacing rollers and are adapted to bear against the axle and the hub 13 of the wheel.

Surrounding the spacing rollers and within the grooves at the ends thereof are the hinged assembling or holding rings 14; which rings are convexed on their inner surfaces and engage with the necks of the spacing rollers within their grooves. These holding rings are composed of two hinged members, the free ends being detachably secured together.

In order to assemble the spacing rollers the assembling rings are opened and the spacing rollers are put in place after which the free ends of the ring are secured together in any suitable manner. After the spacing rollers have been placed on the axle the bearing rollers are then put in their places on the axle, one between each two spacing rollers and are held in place by any temporary holding means (not shown). The hub 13 is then pushed on, the temporary holding means being removed before screwing it to the dust cap 15.

It will be observed that the co-operation of the concave grooves in the spacing rollers with the convex surfaces of the adjacent faces of the rings and the track flanges results not only in holding the spacing rollers against undue endwise shifting with the least possible friction but also, by reason of the centering action resulting from these convex and concave surfaces, to prevent the rings striking against the adjacent ends of the load-sustaining rollers thus permitting the ends of the load-sustaining rollers to be brought close to the rings and thus utilize the full width of the bearing portion of the shaft or axle structure.

Having described my invention what I claim as new and desire to secure by Letters Patent is:—

1. In combination, a shaft structure having two annular flanges one at each opposite end of its bearing portion, an outer cylindrical member, load-sustaining rollers extending the full length of the distance between said annular flanges and having contact throughout their length with the shaft structure between said annular flanges, spacing rollers arranged intermediate the load-sustaining rollers and each having longitudinal contact with the two adjacent load-sustaining rollers, these spacing rollers being of less diameter than the load-sustaining rollers whereby they will be supported or suspended out of contact with the bearing portion of the axle and also the outer member, these spacing rollers being of greater length than the load-sustaining rollers and each having an annular groove near each of its ends which engages the adjacent one of the flanges on the axle, and two rings loosely hung in the annular grooves in the spacing rollers, each of said grooves being concave and the adjacent faces of the flanges and rings being convex.

2. In combination, a shaft structure having secured thereto two rigid annular flanges, one at each end of its bearing-portion, an outer cylindrical member, load-sustaining rollers having contact with the shaft between said annular flanges, spacing-rollers intermediate the load-sustaining rollers and each having longitudinal contact with the two adjacent load-sustaining rollers, these spacing-rollers being of less diameter than the load-sustaining rollers whereby they will be suspended out of contact with the bearing-portion of the axle and the outer member, these spacing-rollers being of greater length than the load-sustaining rollers and each having an annular groove near each of its ends which engages the adjacent one of the flanges on the axle, and two rings loosely hung in the annular grooves in the spacing rollers beyond the ends of the load-sustaining rollers.

3. In combination, a shaft structure having secured thereto two rigid annular flanges, one at each end of its bearing portion, an outer cylindrical member, load-sustaining rollers bearing on the shaft structure between said annular flanges, spacing rollers intermediate the load-sustaining rollers and each having longitudinal contact with the two adjacent load-sustaining rollers, these spacing rollers being of less diameter than the load-sustaining rollers and having grooves in their ends which engage over the annular flanges on the shaft structure, whereby they are freely supported between the shaft structure and the outer member, and two rings loosely hung in the annular grooves in the spacing rollers.

4. In combination, a shaft structure having secured thereto two rigid annular flanges, one at each end of its bearing portion, an outer cylindrical member, load-sustaining rollers bearing on the shaft structure, spacing rollers intermediate the load-sustaining rollers and each having longitudinal contact with the two adjacent load-sustaining rollers, these spacing-rollers having grooves in their ends which engage over the annular flanges on the shaft structure, whereby they are freely supported between the shaft structure and the outer member, and two rings loosely hung in the annular grooves in the spacing rollers.

In witness that I claim the foregoing I have hereunto subscribed my name this 30th day of August, 1906.

WILLIAM T. FLEMING.

Witnesses:
EDMUND A. STRAUSE,
G. E. HARPHAM.